(12) United States Patent
Arndt et al.

(10) Patent No.: US 6,902,124 B2
(45) Date of Patent: Jun. 7, 2005

(54) FUEL INJECTION VALVE

(75) Inventors: Stefan Arndt, Stuttgart (DE); Werner Herden, Gerlingen (DE); Martin Maier, Moeglingen (DE); Guenther Hohl, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 190 days.

(21) Appl. No.: 10/088,278

(22) PCT Filed: Jul. 13, 2001

(86) PCT No.: PCT/DE01/02548

§ 371 (c)(1),
(2), (4) Date: Jul. 24, 2002

(87) PCT Pub. No.: WO02/06665

PCT Pub. Date: Jan. 24, 2002

(65) Prior Publication Data

US 2003/0052203 A1 Mar. 20, 2003

(30) Foreign Application Priority Data

Jul. 15, 2000 (DE) .......................... 100 34 444

(51) Int. Cl.⁷ ..................... F02M 59/00; F02M 39/00; B05B 1/30
(52) U.S. Cl. ................. 239/533.2; 239/533.3; 239/533.11; 239/585.1; 239/585.5
(58) Field of Search .......................... 239/533.2, 533.3, 239/88–93, 533.8, 533.9, 533.11, 585.1–585.5; 251/129.15, 129.21, 127

(56) References Cited

U.S. PATENT DOCUMENTS

| | | | |
|---|---|---|---|
| 5,156,132 A | * 10/1992 | Iwanaga | .................... 123/496 |
| 5,706,778 A | 1/1998 | Kapus | |
| 6,039,272 A | * 3/2000 | Ren et al. | .................... 239/597 |
| 6,220,528 B1 | * 4/2001 | Cooke et al. | ............. 239/533.3 |
| 6,260,775 B1 | * 7/2001 | Lambert et al. | ......... 239/533.3 |
| 6,431,469 B2 | * 8/2002 | Lambert et al. | ......... 239/533.3 |

FOREIGN PATENT DOCUMENTS

| | | |
|---|---|---|
| DE | 27 11 391 | 9/1978 |
| DE | 30 48 304 | 7/1982 |
| DE | 32 28 079 | 2/1984 |
| DE | 35 40 660 | 5/1987 |
| EP | 0 967 382 | 12/1999 |
| JP | 08 004 625 | 1/1996 |

* cited by examiner

Primary Examiner—Davis Hwu
(74) Attorney, Agent, or Firm—Kenyon & Kenyon

(57) ABSTRACT

A fuel injector, in particular, an injector for fuel injection systems of internal combustion engines, having an actuator, which cooperates with a valve needle, has a first valve closure member that is arranged on the valve needle, the valve closure member cooperating with a first valve seat surface on a valve body forming a first sealing seat. A second valve closure member cooperates with a second valve seat surface in the valve seat body forming a second sealing seat. The valve needle, or the first valve closure member, has a limit stop, against which, after a partial stroke of the valve needle, a counter limit stop of the second valve closure member strikes, lifting the second valve closure member from the second sealing seat in response to a further stroke of the valve needle.

18 Claims, 3 Drawing Sheets

FUEL INJECTION VALVE

FIELD OF THE INVENTION

The present invention relates to a fuel injector.

BACKGROUND INFORMATION

A fuel injector is already known which has a valve needle, that is controlled by an actuator. The actuator is composed, e.g., of an electromagnetic coil or a piezo element. An exemplary fuel injector of the species, having an electromagnetic coil, is described in German Patent No. 35 40 660. The fuel injector has a valve housing, in which a solenoid coil is arranged on a coil support. A valve needle, having a valve closure member that is configured on the former as one piece, cooperates with a valve seat surface forming a sealing seat. At its end facing the solenoid coil, the valve needle is fixedly connected to an armature and is acted upon by a resetting spring against the sealing seat. If a current flows through the solenoid coil, the armature is pulled against the force of the resetting spring and lifts the valve needle off from its sealing seat. The fuel can then exit through a spray-discharge bore hole which adjoins the valve seat.

A disadvantage in this known fuel injector is the fact that the angle at which the injection takes place is fixed, and the quantity of fuel can only be regulated to a very limited degree. It is difficult or impossible to make adjustments with respect to various operating states, such as are necessary in particular in the case of lean- mixture concepts and stratified-charge methods in combination with direct injection into the combustion chamber. For this purpose, it is necessary to attain varying operating states using injection angles that vary in their direction.

German Published Patent Application No. 32 28 079 describes a fuel injector is known which has two valve needles. For converting fuel under medium pressure to fuel under high pressure, the fuel injector has a differential piston. Both valve needles are acted upon by one spring, in each case, against one sealing seat. If the one valve needle is lifted from its sealing seat by the amount of a certain prestroke, then it strikes against a limit stop of the other valve needle and, in the further stroke, it takes this valve needle with it. The two sealing seats of the two valve needles close different spray-discharge openings, which can be oriented at different angles. However, it is not possible to achieve a substantial and individual adjustment with respect to performance characteristics of an internal combustion engine, such as in the case of a fuel injector that is controlled by an actuator. In addition, the design has many parts, and the interposition of a differential piston results in a certain sluggishness of the fuel injector with respect to its response performance.

German Published Patent Application No. 30 48 304 describes a fuel injector for internal combustion engines, having a valve needle and an auxiliary needle in a bore hole of the valve needle. The valve needle, at its segment on the combustion-chamber side configured as a valve closure member, cooperates with a valve seat surface to form a sealing seat, which separates spray-discharge bore holes from a fuel supply. The auxiliary needle, guided in the valve needle, also has a valve closure member, which cooperates with a second valve seat surface of the fuel injector. As a result of a spring placed in the valve needle, the auxiliary needle is pulled against the valve needle, in which direction it also forms a sealing seat along with a valve seat surface in the valve needle. If the hydraulically actuated fuel injector begins to open as a result of an increase in the pressure in the fuel supply line, then the auxiliary needle is pressed from its sealing seat in the valve needle against the sealing seat in the valve body and closes a group of spray-discharge bore holes, while a further group of spray-discharge bore holes is opened. If the pressure continues to increase, then the valve needle is lifted from its sealing seat, and, after a certain stroke, it takes the auxiliary needle with it, the auxiliary needle striking against the limit stop of the valve needle. All spray-discharge bore holes are then released. It is disadvantageous that the driving of the valve needle stroke is only carried out using the pressure of the fuel, and an adjustment with respect to the performance characteristics of an internal combustion engine is therefore only possible to a limited degree.

German Published Patent Application No. 27 11 391 describes a fuel injector having an operating piston for regulating the maximum stroke of a valve needle. The valve needle is acted upon in the closing direction by a spring and cooperates with a valve seat surface to form a sealing seat. The valve needle is controlled purely hydraulically. Using the operating piston, which is also hydraulically adjustable in its stroke, the stroke of the valve needle is limited, or completely prevented. Driving this operating piston is accomplished using its own supply line. In accordance with the stroke of the operating piston, the through-flow quantity of fuel can be limited. It is disadvantageous in the fuel injector that the design is multi-part and cumbersome, and therefore is expensive to manufacture.

SUMMARY OF THE INVENTION

In contrast, the fuel injector according to the present invention has the advantage of making possible in the combustion chamber of an internal combustion engine a distribution of the fuel that is adjusted to the requirements of the performance characteristics and, in particular, of a lean-mixture concept.

In particular, the angle at which the fuel is distributed in the jet image of the fuel injector can be modified as a function of the valve stroke. This is assured in the fuel injector according to the present invention by the second valve closure member and by having the valve needles driven by a common actuator. The fuel injector can be opened in two stages, the sealing seats being opened one after the other.

Advantageously, as a result of the two sealing seats of the two valve needles, two different hole circles, made up of spray-discharge bore holes, can be actuated.

In particular, the spray-discharge bore holes of the different hole circles can have different spray-discharge angles and can be offset with respect to each other. Advantageously, when the injection quantities and the loads of the internal combustion engine are slight, it is initially possible to open only a first hole circle. The latter has, e.g., a narrow spray-discharge angle of the spray-discharge bore holes, so that a fuel injection jet is formed having overall a narrow angle range. In response to higher loads of the internal combustion engine and to the corresponding requirements in the stratified-charge operation of an internal combustion engine that is operated using a lean-mixture concept, the spray-discharge bore holes of the second hole circle are opened. The bore holes can be arranged at a greater spray-discharge angle.

DETAILED DESCRIPTION

Figure 1:
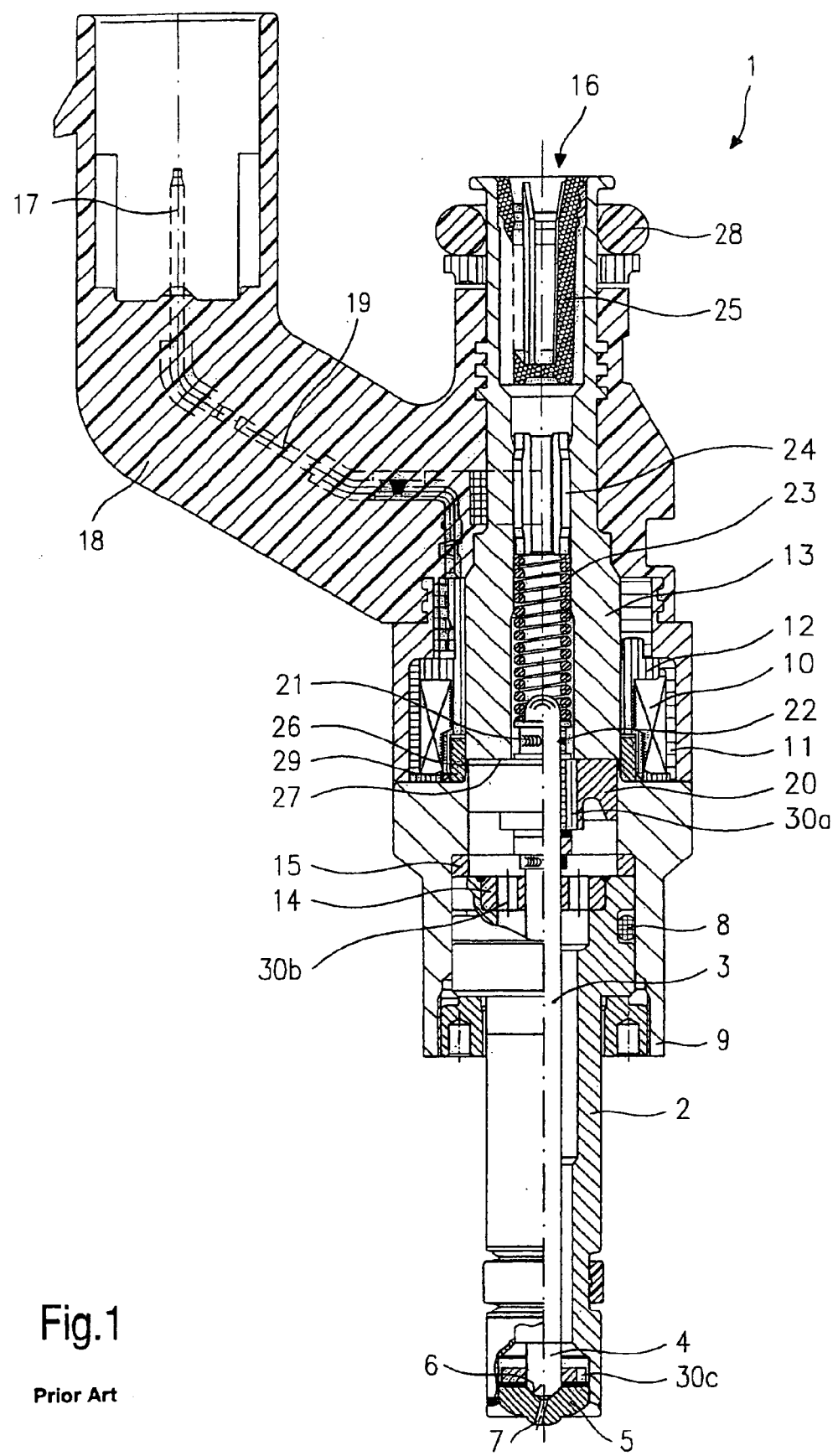
FIG. 1 depicts a section of a fuel injector of the species, having a valve needle that is controlled using an actuator.
Figure 2:
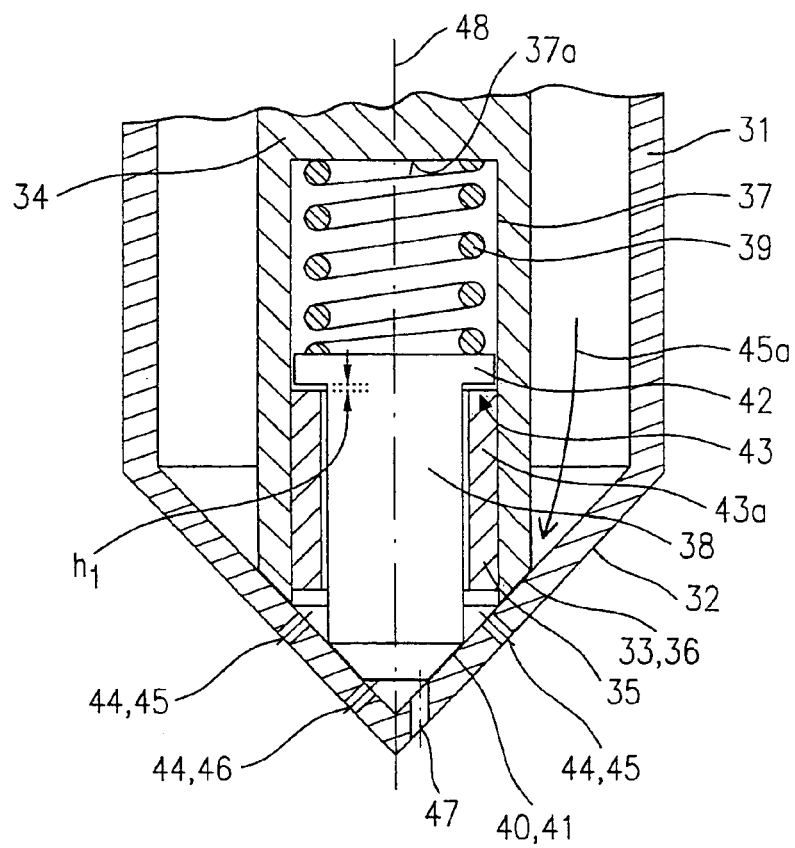
FIG. 2 depicts a segment of a first exemplary embodiment of a fuel injector according to the present invention in a cutaway view.
Figure 3:
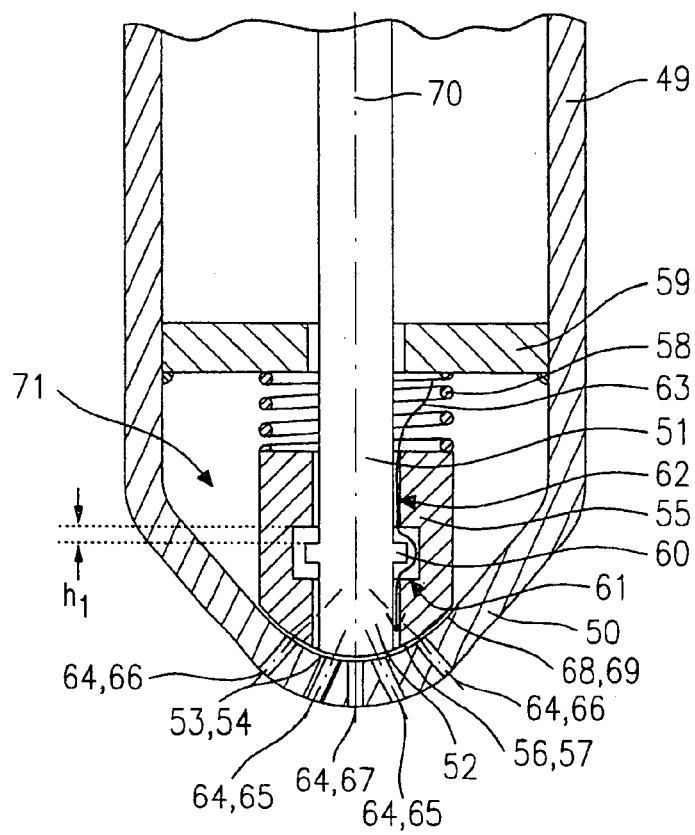
FIG. 3 depicts a segment of a second exemplary embodiment of a fuel injector according to the present invention in a cutaway view.
Figure 4:
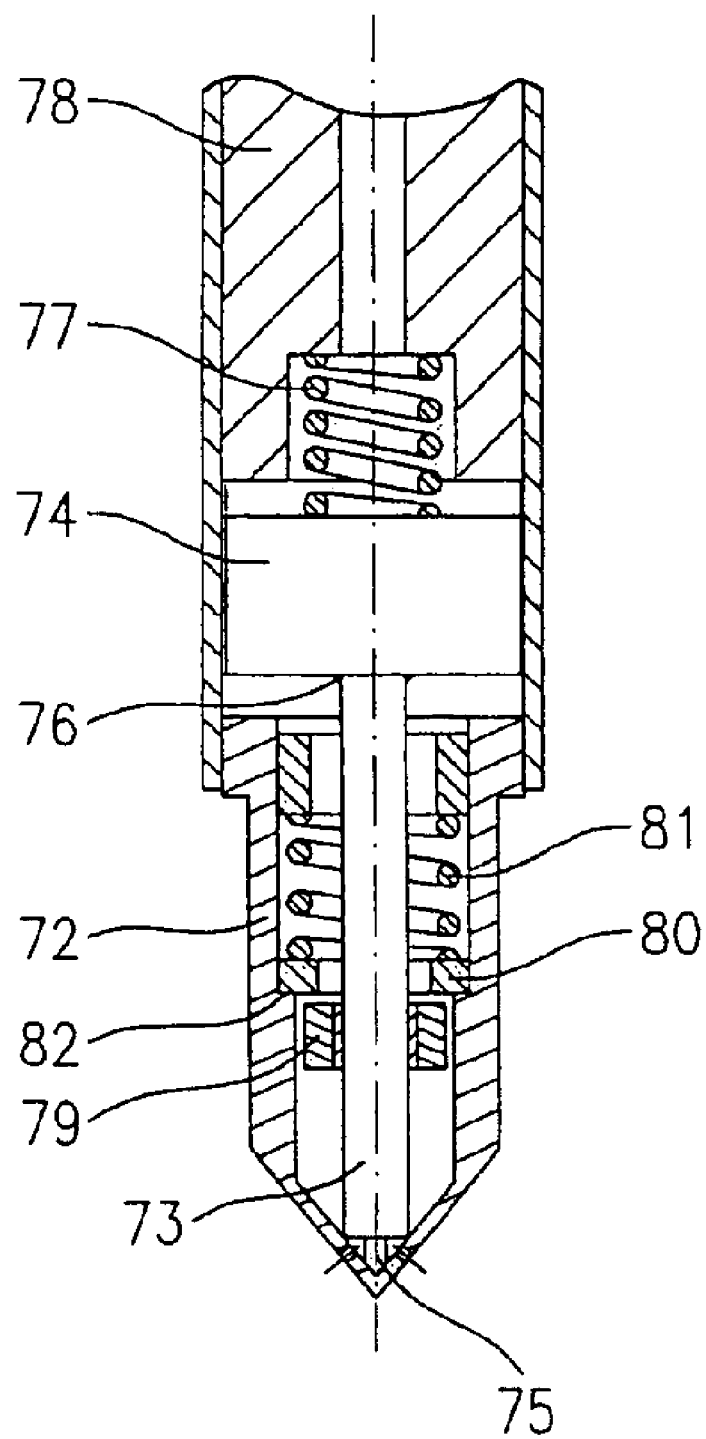
FIG. 4 depicts a segment of a third exemplary embodiment of a fuel injector according to the present invention in a cutaway view.

Before three exemplary embodiments of a fuel injector according to the present invention are described in greater detail on the basis of FIGS. 2 through 4, an already known generic fuel injector will first be briefly discussed on the basis of FIG. 1 with respect to its essential components in order to achieve better understanding of the present invention.

Fuel injector 1 is executed in the form of fuel injector for fuel injection systems of mixture-compressing, spark-ignition internal combustion engines. Fuel injector 1 is especially suited for the direct injection of fuel into an undepicted combustion chamber of an internal combustion engine.

Fuel injector 1 is composed of a nozzle body 2, in which a valve needle 3 is guided. Valve needle 3 is in an operative connection with a valve closure member 4, which cooperates with a valve seat surface 6, arranged on a valve seat body 5, forming a sealing seat. In the exemplary embodiment, fuel injector 1 is a fuel injector 1 that opens to the inside, which is provided with a spray-discharge opening 7. Nozzle body 2 is sealed by a gasket seal 8 against outer pole 9 of a solenoid coil 10, which functions as an actuator. Solenoid coil 10 is encapsulated in a coil housing 11 and is wound on a coil support 12, which contacts one interior pole 13 of solenoid coil 10. Interior pole 13 and exterior pole 9 are separated from each other by a gap 26 and are supported on a connecting part 29. Solenoid coil 10 is excited via a line 19 by an electrical current that is supplied over the electrical plug-in contact 17. Plug-in contact 17 is surrounded by a plastic sleeve 18, which can be injection-molded on interior pole 13.

Valve needle 3 is guided in a valve needle guide 14, which is executed in a disk shape. To adjust the stroke, there is a separated adjusting disk 15. Located on the other side of adjusting disk 15 is an armature 20. The latter is connected via a flange 21 to valve needle 3 in a force-locking manner, the valve needle being joined to flange 21 by a welded seam 22. Supported on flange 21 is a resetting spring 23, which in the present design of fuel injector 1 is biased by a sleeve 24. Running in valve needle guide 14, in armature 20, and on valve seat support 5, are fuel channels 30a through 30c, which convey the fuel to spray-discharge opening 7, the fuel being supplied via a central fuel supply line 16 and being filtered through filter element 25. Fuel injector 1 is sealed by a gasket seal 28 against a cylinder head, or a fuel distributor, which is not further depicted.

In the resting state of fuel injector 1, armature 20 is acted upon by resetting spring 23 opposite to the stroke direction, so that valve closure member 4 is held in the sealing position on valve seat 6. In response to the excitation of solenoid coil 10, the latter generates a magnetic field, which moves armature 20 in opposition to the spring force of resetting spring 23 in the stroke direction, the stroke being stipulated by a working gap 27, in the resting position, located between interior pole 12 and armature 20. In the stroke direction, armature 20 also takes with it flange 21, which is welded to valve needle 3. Valve closure member 4, in an operative connection to valve needle 3, lifts off from the valve seat surface, and fuel is ejected through spray-discharge opening 7.

If the coil current is switched off, after a sufficient degradation of the magnetic field, armature 20 falls away from interior pole 13, due to the pressure of resetting spring 23, as a result of which flange 21, in an operative connection to valve needle 3, moves in opposition to the stroke direction. Valve needle 3 in this way is moved in the same direction, as a result of which valve closure member 4 is placed on valve seat surface 6, and fuel injector 1 is closed.

The section depicted in the cutaway view in FIG. 2 of a first exemplary embodiment according to the present invention shows a valve body 31, which is configured in one piece along with valve seat body 32 and which has, e.g., a truncated-cone valve seat surface 33. A valve needle 34 is formed in one piece along with a first valve closure member 35, which cooperates with valve seat surface 33 to form a first exterior sealing seat 36. Guided in a bore hole 37 of valve needle 34 is a second valve closure member 38, which is acted upon by a force exerted by a spring 39, which is supported against a bore hole base 37a of valve needle 34. Second valve closure member 38 cooperates with a second valve seat surface 40, which is arranged in valve seat body 32, forming a second interior sealing seat 41. In the embodiment described here, first valve seat surface 33 and second valve seat surface 40 are favorably provided as one single continuous surface in valve seat body 32, as a result of which they are advantageously shaped from the production-technical point of view.

Second valve closure member 38 has a collar 42. Serving as a limit stop is a step 43 in bore hole 37, the step being executed here as a sleeve 43a that is inserted into bore hole 37. Between first sealing seat 36 and second sealing seat 41 are arranged spray-discharge bore holes 44 around the circumference, which form a first exterior hole circle 45. Further spray-discharge bore holes 44 are arranged so that they can be sealed both by first sealing seat 36 as well as by second sealing seat 41 opposite a fuel supply 45a, here indicated by an arrow, and so that they constitute a second interior hole circle 46. In addition, a centrally oriented spray-discharge bore hole 47 is also present, which, in addition to both hole circles 45 and 46, emits a fuel jet in the direction of a longitudinal axis 48 of fuel injector 1. Spray-discharge bore hole 47 can also belong to interior hole circle 46.

If valve needle 34 is lifted by the actuator from its first sealing seat 36, then initially only first hole circle 45 having its spray-discharge bore holes 44 is released. Only when collar 42 of second valve closure member 38 contacts limit stop 43 of valve needle 34 after a partial stroke $h_1$ is second valve closure member 38 also lifted from its sealing seat 41, and spray-discharge bore holes 44, 47 of second hole circle 46, or centrally oriented spray-discharge bore hole 47, is released. As a result, it is possible to individually adjust the angle at which the fuel injection jet fans out, taking into account the requirements of a stratified-charge concept, or of a lean-mixture concept. It is only possible to open valve needle 34 in a stroke that is smaller than partial stroke $h_1$. If spray-discharge bore holes 44 of first hole circle 45 have a smaller angle with respect to longitudinal axis 48, then the fuel injection jet, which arises and is here not further depicted, only fans out at a small angle in the combustion chamber. On the other hand, if a broad fanning out of the fuel injection jet at a large angle is desired, then, as a result of an overall stroke of valve needle 34 that is greater than partial stroke $h_1$, second valve closure member 38 can also be lifted off from its sealing seat 41, and both hole circles 45, 46 are opened. Through additionally opened spray-discharge bore holes 44, which can have a different angle, it is possible to achieve a different shape of the fuel injection jet.

FIG. 3 depicts a segment of a second fuel injector according to the present invention in a cutaway representation of the lower segment, which is facing the undepicted combustion chamber. A valve body 49 is configured in one piece along with a valve seat body 50. A valve needle 51, which is configured in one piece along with a first valve closure member 52, cooperates with a valve seat surface 53 to form a first interior sealing seat 54. A second valve closure member 55 cooperates with a second valve seat surface 56 to form a second exterior sealing seat 57. Second valve closure member 55 is supported via a spring 58 against an intermediate plate 59 of valve body 49.

Serving as a limit stop of valve needle 51 is a circumferential collar 60 of valve needle 51. The counter limit stop of second valve closure member 55 is a circular groove 61 in an interior bore hole 62 of second valve closure member 55, through which valve needle 51 passes. Fuel supply 63, which is indicated here by an arrow, is accomplished circumferentially outside of valve needle 51 and of first valve closure member 52, and radially within second valve closure member 55, e.g., in a gap or one or more grooves between these two valve closure members 52, 55. A further fuel supply leading to exterior spray-discharge bore holes 64, which are arranged in valve seat body 50, is constituted radially outside second valve closure member 55 of surrounding chamber 71.

Opposite fuel supply 63, a first interior hole circle 65, composed of spray-discharge bore holes 64, is sealed by first sealing seat 54. A second exterior hole circle 66, made up of spray-discharge bore holes 64, is sealed by second exterior sealing seat 57, opposite fuel supply 63. Second valve closure member 55 on a third valve seat surface 68, which is arranged in valve seat body 50, has a third sealing seat 69, which seals second hole circle 66 opposite surrounding chamber 71, which is filled with fuel. A further spray-discharge bore hole 64 is provided as a central spray-discharge bore hole 67 in valve seat body 50.

If valve needle 51 is lifted by the undepicted actuator, and if the stroke is smaller than partial stroke $h_1$, then valve needle 51 is lifted, and first sealing seat 54 is released. Only spray-discharge bore holes 64 of first hole circle 65 and a centrally oriented spray-discharge bore hole 67 are now connected to fuel supply 63. If the actuator is activated to the extent that the stroke of valve needle 51 is greater than partial stroke $h_1$, then second valve closure member 55 is carried along by collar 60, which strikes against groove 61 in bore hole 62. Second sealing seat 57 is now released opposite fuel supply 63, and third sealing seat 69 opposite surrounding chamber 71. The jet image of the fuel injection jet can now be expanded if second hole circle 66 has a larger spray-discharge angle with respect to a longitudinal axis 70.

FIG. 4 depicts a fuel injector, in highly schematic form, in a cutaway cross-section corresponding to a third exemplary embodiment according to the present invention. In a valve body 72, a valve needle 73 is arranged, which is joined to an armature 74 by a welded seam 76. From valve needle 73, a second valve closure member 75 protrudes, similar to the design according to FIG. 2. Valve needle 73 is acted upon by a biasing force via armature 74 by a spring 77. At spring 77, core 78 of an electromagnetic actuator closes, whose coil is not depicted here. Arranged around valve needle 73, and fixedly connected thereto, is a stop ring 79. Movably arranged in valve body 72 and supporting itself against a step 82 in valve body 72 is a limit stop ring 80, which is pressed by a second spring 81 against this step 82. If armature 74 and valve needle 73 are pulled by the armature, then, after a predetermined stroke, stop ring 79 strikes against limit stop ring 80. To continue to pull valve needle 73, the force of spring 81 must also be overcome.

As a result of this design, two different stroke ranges can be very well distinguished so as to be easily controllable. In particular, it is possible to distinguish two opening states of the fuel injector in an easily controllable manner, if the stroke, after which stop ring 79 comes into contact with limit stop ring 80, is selected so that it corresponds to partial stroke $h_1$, of FIG. 2.

What is claimed is:

1. A fuel injector, comprising:
   a valve needle;
   a valve seat body including a first valve seat surface and a second valve seat surface;
   an actuator that cooperates with the valve needle;
   a first valve closure member arranged on the valve needle and cooperating with the first valve seat surface on the valve seat body to form a first sealing seat;
   a second valve closure member cooperating with the second valve seat surface in the valve seat body to form a second sealing seat; and
   a spring supported against a spring receptacle, wherein:
      the valve seat body includes a first circumferential hole circle element having a plurality of spray-discharge bore holes that are arranged in the valve seat body so that the first sealing seat seals the first circumferential hole circle element with respect to a fuel supply,
      the second valve closure member surrounds one of the valve needle and the first valve closure member,
      the second valve closure member is guided by the first valve closure member and is biased against the second sealing seat by the spring,
      a second circumferential hole circle element including a plurality of spray-discharge bore holes is arranged so that the second sealing seat seals the second circumferential hole circle element radially on an interior, and
      a third sealing seat, which is formed by the second valve closure member having the valve seat body on a third valve seat surface, seals the second circumferential hole circle element radially to an outside with respect to a further fuel supply, and
      one of the valve needle and the first valve closure member includes a limit stop, at which, after a partial stroke of the valve needle, a counter limit stop of the second valve closure member comes into contact and lifts the second valve closure member in a further stroke of the valve needle from the second sealing seat.

2. The fuel injector as recited in claim 1, wherein:
   the fuel injector is for a fuel injection system of an internal combustion engine.

3. The fuel injector as recited in claim 1, wherein:
   a second circumferential hole circle element including a plurality of spray-discharge bore holes is arranged so that the first sealing seat and the second sealing seat seal the second circumferential hole circle element with respect to the fuel supply.

4. The fuel injector as recited in claim 3, wherein:
one of the valve needle and the first valve closure member surrounds and guides the second valve closure member.

5. The fuel injector as recited in claim 3, wherein:
the spray-discharge bore holes of the first circumferential hole circle element have different spray-discharge angles with respect to the
spray-discharge bore holes of the second circumferential hole circle element.

6. The fuel injector as recited in claim 1, wherein:
the limit stop includes a circumferential collar, and
the counter limit stop includes a groove in a bore hole, in which one of the first valve closure member and the valve needle passes through the second valve closure member.

7. The fuel injector as recited in claim 1, wherein:
the first valve closure member and the second valve closure member are coaxial with each other.

8. The fuel injector as recited in claim 1, wherein:
the valve seat body includes a central spray-discharge bore hole.

9. A fuel injector, comprising:
a valve needle;
a valve seat body including a first valve seat surface and a second valve seat surface;
an actuator that cooperates with the valve needle;
a first valve closure member arranged on the valve needle and cooperating with the first valve seat surface on the valve seat body to form a first sealing seat; and
a second valve closure member cooperating with the second valve seat surface in the valve seat body to form a second sealing seat, wherein:
one of the valve needle and the first valve closure member includes a limit stop, at which, after a partial stroke of the valve needle, a counter limit stop of the second valve closure member comes into contact and lifts the second valve closure member in a further stroke of the valve needle from the second sealing seat,
the valve seat body includes a first circumferential hole circle element having a plurality of spray-discharge bore holes that are arranged in the valve seat body so that the first sealing seat seals the first circumferential hole circle element with respect to a fuel supply, and
the second valve closure member surrounds one of the valve needle and the first valve closure member.

10. The fuel injector as recited in claim 9, wherein:
the fuel injector is for a fuel injection system of an internal combustion engine.

11. The fuel injector as recited in claim 9, wherein the fuel supply is arranged with respect to the first sealing seat, and wherein the fuel supply is arranged circumferentially outside the valve needle and the first valve closure member and radially inside the second valve closure member.

12. The fuel injector as recited in claim 11, wherein the fuel supply is formed by one of a gap and at least one groove between the first valve closure member and the second valve closure member.

13. The fuel injector as recited in claim 9, further comprising:
a spring supported against a spring receptacle, wherein:
the second valve closure member is guided by the first valve closure member and is biased against the second sealing seat by the spring,
a second circumferential hole circle element including a plurality of spray-discharge bore holes is arranged so that the second sealing seat seals the second circumferential hole circle element radially on an interior, and
a third sealing seat, which is formed by the second valve closure member having the valve seat body on a third valve seat surface, seals the second circumferential hole circle element radially to an outside with respect to a further fuel supply.

14. The fuel injector as recited in claim 13, further comprising:
a surrounding chamber, wherein the further fuel supply to the outer spray-discharge bore holes radially outside the second valve closure member is implemented from the surrounding chamber.

15. The fuel injector as recited in claim 13, wherein one of the limit stop of the valve needle and the first valve closure member includes a circumferential collar, the counter limit stop of the second valve closure member is a groove in a bore hole, in which one of the first valve closure member and the valve needle passes through the second valve closure member.

16. The fuel injector as recited in claim 13, wherein the spray-discharge bore holes of the first circumferential hole circle element have different spray-discharge angles with respect to the spray-discharge bore holes of the second circumferential hole circle element.

17. The fuel injector as recited in claim 9, wherein the first valve closure member the second valve closure member are coaxial with each other.

18. The fuel injector as recited in claim 9, wherein the valve seat body includes a central spray-discharge bore hole.

* * * * *

UNITED STATES PATENT AND TRADEMARK OFFICE
CERTIFICATE OF CORRECTION

PATENT NO. : 6,902,124 B2  
DATED : June 7, 2005  
INVENTOR(S) : Arndt et al.

It is certified that error appears in the above-identified patent and that said Letters Patent is hereby corrected as shown below:

Column 8,  
Line 47, change "valve closure member the second valve closure member" to -- valve closure member and the second valve closure member --.

Signed and Sealed this

Thirteenth Day of December, 2005

JON W. DUDAS  
*Director of the United States Patent and Trademark Office*